US011026535B2

(12) United States Patent
Grimaldi et al.

(10) Patent No.: US 11,026,535 B2
(45) Date of Patent: Jun. 8, 2021

(54) OVEN WITH MACHINE LEARNING BASED ALGORITHM SELECTION STRATEGY

(71) Applicant: ILLINOIS TOOL WORKS INC., Glenview, IL (US)

(72) Inventors: Giorgio Grimaldi, Northbrook, IL (US); Christopher Hopper, Troy, OH (US); Michele Sclocchi, San Donato Milanese (IT); Joshua M. Linton, Winnetka, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 372 days.

(21) Appl. No.: 15/810,706

(22) Filed: Nov. 13, 2017

(65) Prior Publication Data

US 2018/0146811 A1 May 31, 2018

Related U.S. Application Data

(60) Provisional application No. 62/428,073, filed on Nov. 30, 2016.

(51) Int. Cl.
*A47J 27/00* (2006.01)
*H05B 6/70* (2006.01)
(Continued)

(52) U.S. Cl.
CPC .............. *A47J 27/004* (2013.01); *A47J 36/00* (2013.01); *A47J 36/321* (2018.08);
(Continued)

(58) Field of Classification Search
CPC ........ A47J 27/004; A47J 36/00; A47J 36/321; H05B 6/6435; H05B 6/6473; H05B 6/686; H05B 6/705; Y02B 40/146
(Continued)

(56) References Cited

U.S. PATENT DOCUMENTS 5,412,171 A 5/1995 Yahav et al.
9,167,633 B2 * 10/2015 Ben-Shmuel ........ H05B 6/6402
(Continued)

FOREIGN PATENT DOCUMENTS

CN 1387743 A 12/2002
CN 103843456 A 6/2014
(Continued)

OTHER PUBLICATIONS

International Search Report and Written Opinion from corresponding International Application No. PCT/US2017/062503 dated Feb. 15, 2018, all enclosed pages cited.

*Primary Examiner* — Dana Ross
*Assistant Examiner* — Joseph W Iskra
(74) *Attorney, Agent, or Firm* — Burr & Forman LLP

(57) ABSTRACT

An oven may include a cooking chamber configured to receive a food product, an EM heating system configured to provide EM energy into the cooking chamber using solid state electronic components, and control electronics configured to control the EM heating system. The control electronics are configured to enable user selection of a cooking program associated with cooking the food product. The control electronics select a first algorithm to direct application of the EM energy to the food product. The control electronics perform a learning process to receive feedback on execution of the cooking program during execution of the cooking program according to the first algorithm. Responsive to detecting a trigger event during the learning process, the control electronics are configured to select a second algorithm that is different from the first algorithm to direct application of the EM energy to the food product during execution of the cooking program.

18 Claims, 5 Drawing Sheets

(51) Int. Cl.
*A47J 36/32* (2006.01)
*H05B 6/64* (2006.01)
*H05B 6/68* (2006.01)
*A47J 36/00* (2006.01)

(52) U.S. Cl.
CPC ......... *H05B 6/6435* (2013.01); *H05B 6/6473* (2013.01); *H05B 6/686* (2013.01); *H05B 6/705* (2013.01); *Y02B 40/00* (2013.01)

(58) Field of Classification Search
USPC ........................................................ 219/680
See application file for complete search history.

(56) References Cited

U.S. PATENT DOCUMENTS

| | | | |
|---|---|---|---|
| 9,702,858 B1* | 7/2017 | Minville .............. | G01N 33/02 |
| 2015/0260699 A1* | 9/2015 | Minville .............. | G06F 16/00 |
| | | | 426/231 |
| 2016/0350715 A1* | 12/2016 | Minville .......... | G06Q 10/0875 |
| 2017/0332676 A1* | 11/2017 | Minville ................ | A23L 17/00 |

FOREIGN PATENT DOCUMENTS

| | | | |
|---|---|---|---|
| EP | 0849536 | * | 6/1998 |
| EP | 2051564 A1 | | 4/2009 |
| EP | 2434837 A1 | | 3/2012 |
| WO | 2011058537 A1 | | 5/2011 |
| WO | 2013033330 A2 | | 3/2013 |
| WO | WO2013033330 | * | 3/2013 |

* cited by examiner

OVEN WITH MACHINE LEARNING BASED ALGORITHM SELECTION STRATEGY

CROSS REFERENCE TO RELATED APPLICATIONS

This application claims priority to U.S. application No. 62/428,073 filed Nov. 30, 2016, the entire contents of which are hereby incorporated by reference in its entirety.

TECHNICAL FIELD

Example embodiments generally relate to ovens and, more particularly, relate to an oven that is enabled to cook food with the application of electromagnetic (EM) energy that is generated by solid state components under the control of various energy application algorithms.

BACKGROUND

Combination ovens that are capable of cooking using more than one heat source (e.g., convection, steam, microwave, etc.) have been in use for decades. Each heat source comes with its own distinct set of characteristics. Thus, a combination oven can typically leverage the advantages of each different heat source to attempt to provide a cooking process that is improved in terms of time and/or quality.

In some cases, microwave cooking may be faster than convection or other types of cooking. Thus, microwave cooking may be employed to speed up the cooking process. However, a microwave typically cannot be used to cook some foods and also cannot brown foods. Given that browning may add certain desirable characteristics in relation to taste and appearance, it may be necessary to employ another cooking method in addition to microwave cooking in order to achieve browning. In some cases, the application of environmental heat within the oven cavity for purposes of browning may involve the use of heated airflow provided within the oven cavity to deliver heat to a surface of the food product.

However, even by employing a combination of microwave and hot airflow, the limitations of conventional microwave cooking relative to penetration of radiation into the food product may still render the combination less than ideal. Moreover, a typical microwave is somewhat indiscriminate or uncontrollable in the way it applies energy to the food product. Thus, it may be desirable to provide further improvements to the ability of an operator to achieve a superior cooking result in a relatively short time. Providing an oven with improved capabilities relative to cooking food with a combination of controllable EM energy and convection energy may also enable unique opportunities for control of and interface with the oven.

BRIEF SUMMARY OF SOME EXAMPLES

Some example embodiments may therefore provide improved mechanisms for control of an oven that employs EM energy application to at least partially cook food disposed in an oven cavity. The oven may be configured to enable not only unique algorithms for providing an improved cooking result, but the oven may be further configured to intelligently move between such algorithms to dynamically react to various stimuli to further improve cooking results.

In an example embodiment, an oven is provided. The oven may include a cooking chamber configured to receive a food product, an EM heating system configured to provide EM energy into the cooking chamber using solid state electronic components, and control electronics configured to control the EM heating system. The control electronics may be configured to enable user selection of a cooking program associated with cooking the food product. The control electronics may be configured to select a first algorithm to direct application of the EM energy to the food product. The control electronics may be configured to perform a learning process to receive feedback on execution of the cooking program during execution of the cooking program according to the first algorithm. Responsive to detecting a trigger event during the learning process, the control electronics are configured to select a second algorithm that is different from the first algorithm to direct application of the EM energy to the food product during execution of the cooking program.

In an example embodiment, control electronics may be provided. The control electronics may be configured to control an EM heating system configured to provide EM energy into a cooking chamber of an oven using solid state electronic components are provided. The control electronics may include a memory and processor. The memory may store a plurality of cooking programs for execution by the processor. The control electronics may be configured to enable user selection of a cooking program associated with cooking a food product in the cooking chamber. The control electronics may select a first algorithm to direct application of the EM energy to the food product. The control electronics may also perform a learning process to receive feedback on execution of the cooking program during execution of the cooking program according to the first algorithm. Responsive to detecting a trigger event during the learning process, the control electronics may be configured to select a second algorithm that is different from the first algorithm to direct application of the EM energy to the food product during execution of the cooking program.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
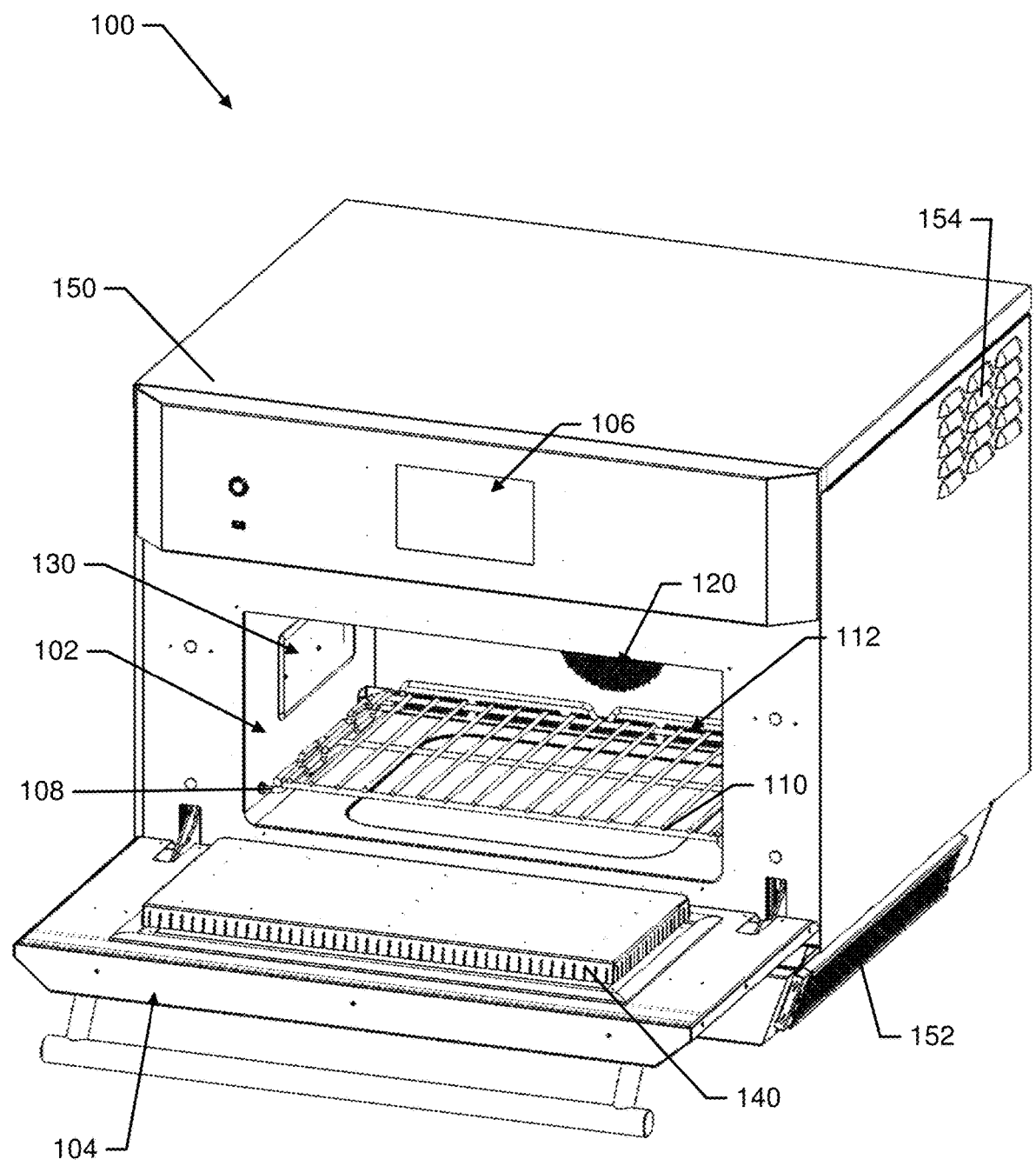
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, the oven may cook, at least in part, using solid state components for control of the application of EM energy. Various unique options for control of the EM energy application and for interaction with the oven generally, may then be provided.

When using EM energy to heat food product, heat is generally generated directly inside the food product. Various techniques for using EM energy to heat food products include the application of radio frequency (RF) energy (e.g., EM waves that lie generally between about 1 and 300 MHz) and microwave (MW) energy (e.g., MW that lies within a band of frequencies generally between about 300 MHz and 300 GHz).

In EM heating applications according to an example embodiment, the food product (i.e., the workload) sits within an enclosed cavity that is fitted with appropriate RF/MW delivery/launching mechanisms (e.g., waveguides, antennas, and/or the like). The user then applies heat the food product by exposing it to RF/MW energy generated by a source (e.g., a solid state electronic system) within the cavity. The source can deliver the energy into the cavity by either mechanical or electrical delivery means.

Example embodiments aim to provide a reliable and repeatable delivery of the EM energy to the food product in a controlled manner so as to strategically raise the temperature of the entire food product or a portion thereof. This can be a difficult goal to achieve given the vast number of variations in geometry, composition and orientation of the food product within the cavity. Moreover, in some cases, these variable aspects of the food product may actually change during the cooking process. These changes that can occur during the cooking process may cause the efficiency of absorption of the EM energy to change over time, and can thereby add even further complication to the achievement of the goal.

Example embodiments may not only define algorithms for controlling EM energy application in a way that attempts to maximize efficiency or uniformity of heating within the food product, but may also be adaptive to changing conditions in the oven. Algorithms that are tailored to specific conditions, food products and situations may therefore be provided and stored or embedded in the memory of the oven. These algorithms may then be selectively employed by control electronics that are configured to actively monitor aspects of the execution of a cooking program, and use the information gained during the monitoring to select any better algorithm that may exist for currently existing conditions within the oven. Machine learning may be employed to continuously enable continuous learning based on real time feedback about changes in the load, so that adaptive cooking based on changing conditions of the food product (i.e., the workload) can be enabled.

Each algorithm may define a unique way to heat the food product (e.g., in terms of power level, time, frequency and/or phase). Selection of the algorithm to be employed at any given time may be governed by the control circuitry based on machine learning and based on the properties of the food product at the corresponding time. In the beginning, an initial algorithm may be selected based on the type or characteristics of the food product itself, and perhaps also on initial conditions that can be assumed or are provided by the user. Thereafter, the learning process is employed either at defined times, time intervals, or based on detected events that may be dependent on or independent of temporal considerations. With each instance of execution of the learning process, a decision is made whether to alter the algorithm employed by selecting a new algorithm based on results of the learning process (e.g., based on detected changes in properties of the food product).

Example embodiments may provide a closed-loop design for a solid state electronic system so that feedback (e.g., EM frequency, heating efficiency, spatial orientation, location of the food product, and/or the like) can be obtained during the cooking process (e.g., during execution of a selected cooking program). Data may be obtained regarding a current state of the food product at selected points of time during the cooking process via an automated learning process, as mentioned above, to select an algorithm to be employed. The selected algorithm may then direct application of EM energy to the food product to achieve optimal heating of the food product according to the parameters and logic defined for the selected algorithm. The learning process is defined by a rapid and continuous feedback loop that constantly or periodically provides the EM system with information about the food product with respect to EM energy behavior inside the cavity.

In an example embodiment, the EM algorithms that may be employed by the control circuitry automate and direct the controlled interaction between the food product and the energy being delivered into the cavity according to the inherent characteristics of the food product and the food product's propensity to absorb EM energy. As the inherent characteristics and propensity of the food product to absorb EM energy continue to change during the heating of the food product (and from one unique food product to another), a rapid and continuous feedback loop continuously reevaluates the food product to provide data to the EM generation system about the food product's present condition. Upon receiving feedback data responsive to execution of the learning process that indicates the state or present conditions of the food product, the EM generation system may be controlled according to a new selected algorithm best suited to heat the food product optimally in light of the current state and the desired outcome that has been predefined by the user. The desired outcome may be defined in connection with selection of a recipe (e.g., a cooking program), which may define (or have separately user defined) priorities relating to uniform heating, efficient heat delivery, or other heating objectives.

The inclusion of an automated routine for evaluating the best algorithm to employ throughout the cooking process enables 1) a customized heating process for each unique food product (e.g., workload) or food product orientation inside the cavity, and 2) the continuously optimized heating of the food product by constant monitoring and analysis of feedback to allow selection of a new algorithm for energy delivery into the cavity. An example oven and examples of electronic equipment for employment in connection with such an oven will now be described to illustrate some example embodiments.

FIG. 1 illustrates a perspective view of an oven 100 according to an example embodiment. As shown in FIG. 1, the oven 100 may include a cooking chamber 102 (e.g., a cavity) into which a food product may be placed for the application of heat by any of at least two energy sources that may be employed by the oven 100. However, it should be appreciated that example embodiments may also be practiced with a single energy source (e.g., EM energy) as well. The cooking chamber 102 may include a door 104 and an interface panel 106, which may sit proximate to the door 104 when the door 104 is closed. In this regard, for example, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting there between, may form a first air circulation system within the oven 100 (e.g., a forced air circulation system).

Food product placed on a pan or one of the racks 110 (or simply on a base of the cooking chamber 102 in embodiments where racks 110 are not employed) may be heated at least partially using radio frequency (RF) energy, microwave (MW) energy or other EM energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using EM energy with metallic components.

In an example embodiment, the EM energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple EM energy into the cooking chamber 102.

The cooking chamber 102 may be configured to provide EM shielding on five sides thereof (e.g., the top, bottom, back, and right and left sides), but the door 104 may include a choke 140 to provide EM shielding for the front side. The choke 140 may therefore be configured to fit closely with the opening defined at the front side of the cooking chamber 102 to prevent leakage of EM energy out of the cooking chamber 102 when the door 104 is shut and EM energy is being applied into the cooking chamber 102 via the antenna assembly 130.

The antenna assembly 130 may be configured to generate controllable EM emissions into the cooking chamber 102 using solid state components. Thus, the oven 100 may not employ any magnetrons, but instead use only solid state components for the generation and control of the EM energy applied into the cooking chamber 102. The use of solid state components may provide distinct advantages in terms of allowing the characteristics (e.g., power/energy level, phase and frequency) of the EM energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of EM energy to the cooking chamber 102. The second air circulation system may include an inlet array 152 that is formed at a bottom (or basement) portion of the oven body 150. In particular, the basement region of the oven body 150 may be a hollow cavity within the oven body 150 that is disposed below the cooking chamber 102. The inlet array 152 may include multiple inlet ports that are disposed on each opposing side of the oven body 150 proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan)

through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. As such, air drawn into the inlet array 152 can reliably be expected to be air at ambient room temperature, and not recycled, expelled cooling air.

Figure 2:
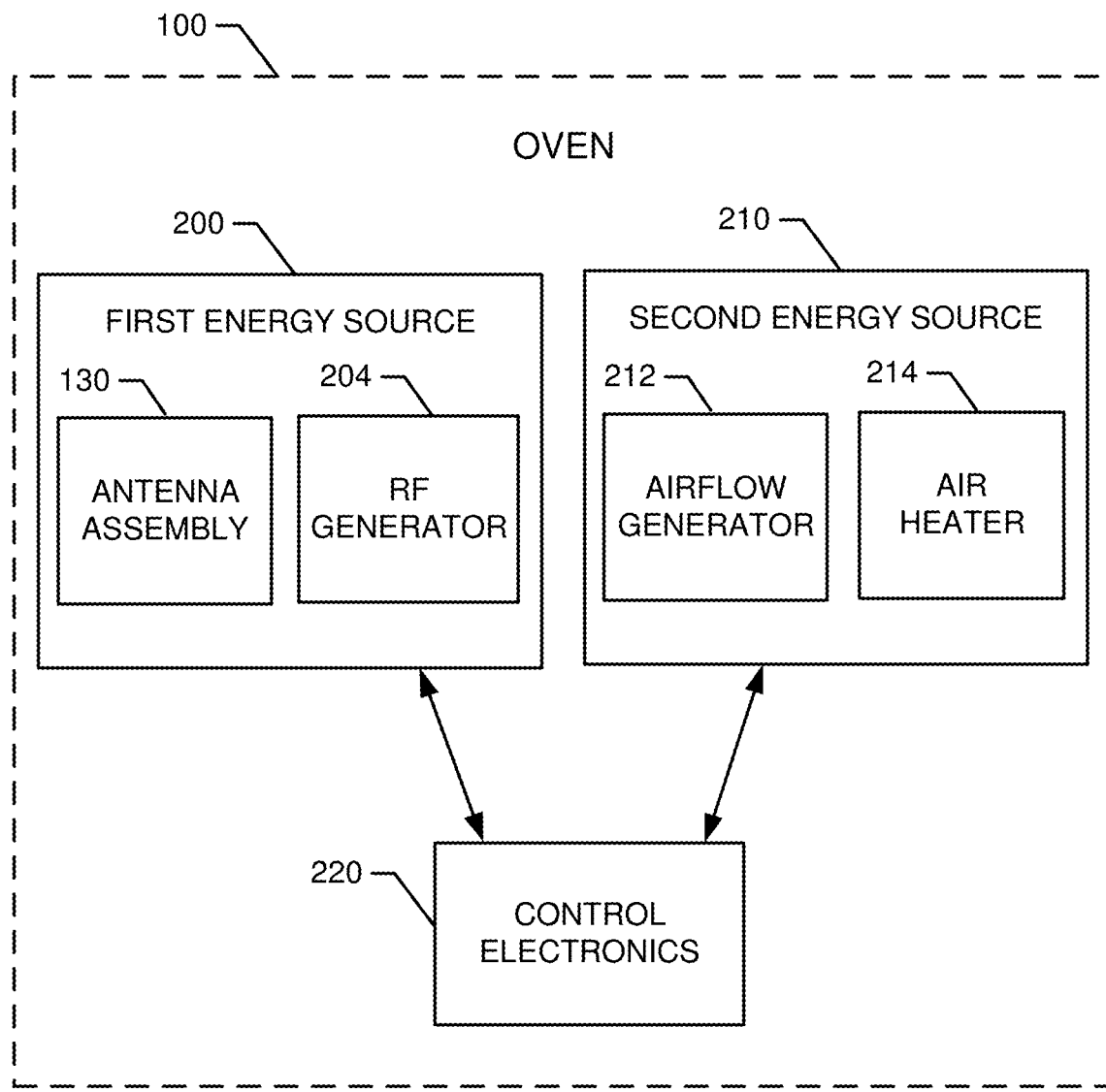
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an EM heating source and a convective heating source, respectively. However, it should be appreciated that additional or alternative energy sources may also be provided in some embodiments.

As mentioned above, the first energy source 200 may be an EM energy source (or EM heating source) configured to generate relatively broad spectrum RF (e.g., within the ISM band) or MW energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from the ISM bands for application by the RF generator 204. As such, although a specific example will be discussed hereinafter in the context of RF energy application, it should be appreciated that RF is one example of EM energy application.

In some cases, the antenna assembly 130 may be configured to transmit the RF energy (as one example of EM energy delivery) into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 (if employed) may be an energy source capable of inducing browning and/or convective heating of the food product. Thus, for example, the second energy source 210 may be a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of heat energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking.

However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

Figure 3:
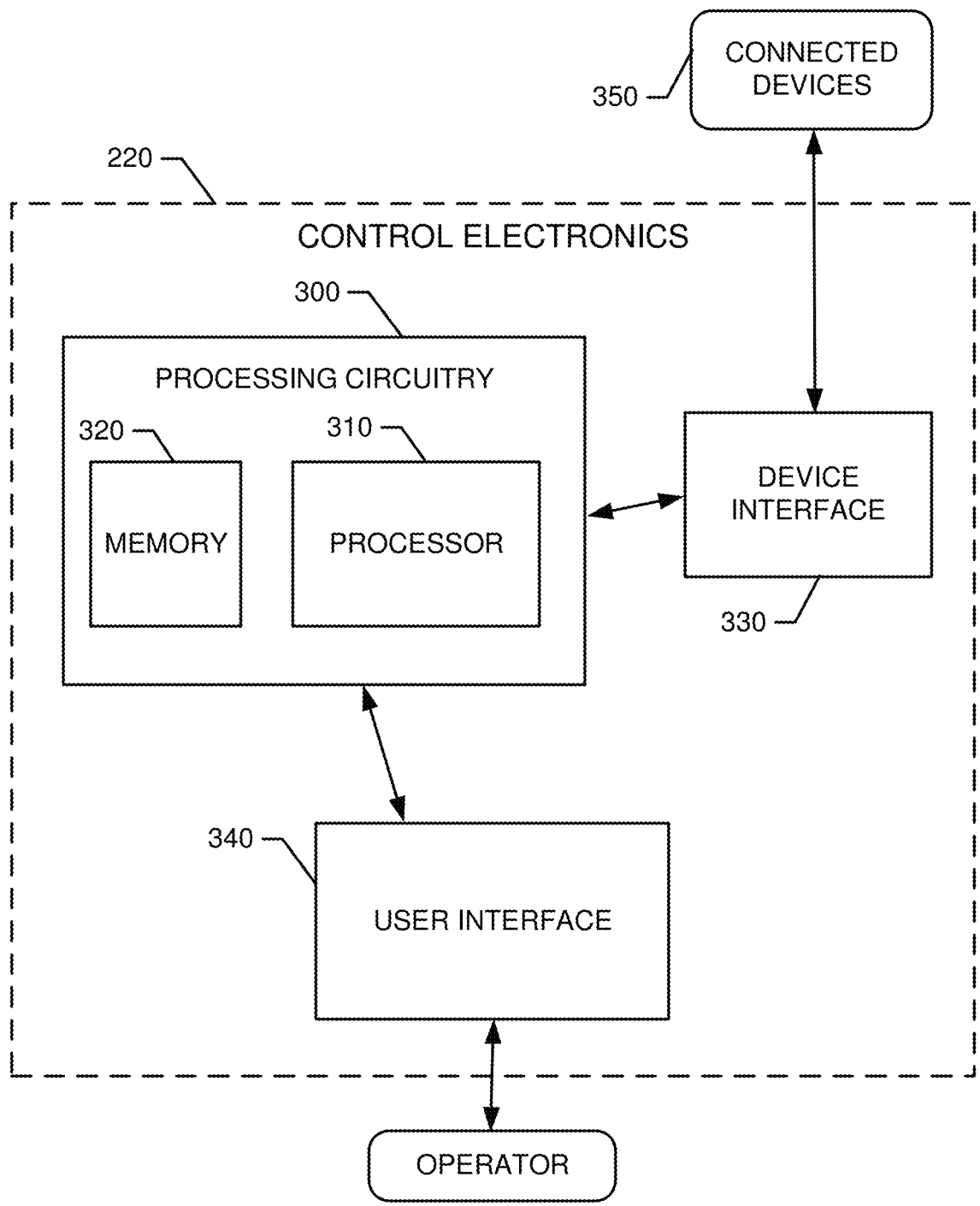
FIG. 3 illustrates a block diagram of control electronics according to an example embodiment.

FIG. 3 illustrates a block diagram of the control electronics 220 according to an example embodiment. In some embodiments, the control electronics 220 may include or otherwise be in communication with processing circuitry 300 that is configurable to perform actions in accordance with example embodiments described herein. As such, for example, the functions attributable to the control electronics 320 may be carried out by the processing circuitry 300.

The processing circuitry 300 may be configured to perform data processing, control function execution and/or other processing and management services according to an example embodiment of the present invention. In some embodiments, the processing circuitry 300 may be embodied as a chip or chip set. In other words, the processing circuitry 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 300 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 300 may include one or more instances of each of a processor 310 and memory 320 that may be in communication with or otherwise control a device interface 330 and a user interface 340. As such, the processing circuitry 300 may be embodied as a circuit chip (e.g., an integrated circuit chip) configured (e.g., with hardware, software or a combination of hardware and software) to perform operations described herein. However, in some embodiments, the processing circuitry 300 may be embodied as a portion of an on-board computer.

The user interface 340 (which may be embodied as, include, or be a portion of the interface panel 106) may be in communication with the processing circuitry 300 to receive an indication of a user input at the user interface 340 and/or to provide an audible, visual, mechanical or other output to the user (or operator). As such, the user interface 340 may include, for example, a display (e.g., a touch screen such as the interface panel 106), one or more hard or soft buttons or keys, and/or other input/output mechanisms.

The device interface 330 may include one or more interface mechanisms for enabling communication with connected devices 350 such as, for example, other components of the oven 100, sensors of a sensor network of the oven 100, removable memory devices, wireless or wired network communication devices, and/or the like. In some cases, the device interface 330 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 330 may receive input at least from a temperature sensor that measures the air temperature of air heated (e.g., by air heater 214) prior to introduction of such air (e.g., by the airflow generator 212) into the cooking chamber 102. Alternatively or additionally, the device interface 330 may provide interface mechanisms for any devices capable of wired or wireless communication with the processing circuitry 300. In still other alternatives, the device interface 330 may provide connections and/or interface mechanisms to enable the processing circuitry 300 to control the cool-air circulating fan, the RF generator 204 or other components of the oven 100.

In an exemplary embodiment, the memory 320 may include one or more non-transitory memory devices such as, for example, volatile and/or non-volatile memory that may be either fixed or removable. The memory 320 may be configured to store information, data, cooking signatures, programs, recipes, applications, instructions or the like for enabling the control electronics 220 to carry out various functions in accordance with example embodiments of the present invention. For example, the memory 320 could be configured to buffer input data for processing by the processor 310. Additionally or alternatively, the memory 320 could be configured to store instructions for execution by the processor 310. As yet another alternative, the memory 320 may include one or more databases that may store a variety of data sets responsive to input from the sensor network, or responsive to programming of any of various cooking programs. Among the contents of the memory 320, applications may be stored for execution by the processor 310 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 310 and stored in memory 320 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results.

The processor 310 may be embodied in a number of different ways. For example, the processor 310 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 310 may be configured to execute instructions stored in the memory 320 or otherwise accessible to the processor 310. As such, whether configured by hardware or by a combination of hardware and software, the processor 310 may represent an entity (e.g., physically embodied in circuitry—such as in the form of processing circuitry 300) capable of performing operations according to example embodiments of the present invention while configured accordingly. Thus, for example, when the processor 310 is embodied as an ASIC, FPGA or the like, the processor 310 may be specifically configured hardware for conducting the operations described herein. Alternatively, as another example, when the processor 310 is embodied as an executor of software instructions, the instructions may specifically configure the processor 310 to perform the operations described herein.

In an example embodiment, the processor 310 (or the processing circuitry 300) may be embodied as, include or otherwise control the control electronics 220. As such, in some embodiments, the processor 310 (or the processing circuitry 300) may be said to cause each of the operations described in connection with the control electronics 220 by directing the control electronics 220 to undertake the corresponding functionalities responsive to execution of instructions or algorithms configuring the processor 310 (or processing circuitry 300) accordingly. As an example, the control electronics 220 may be configured to control air speed, temperature and/or the time of application of convective heat and control RF energy level, frequency and phase based on recipes, algorithms and/or the like in response to user input at the user interface 340. In some examples, the control electronics 220 may be configured to make adjustments to temperature and/or air speed or make adjustments to RF energy level, phase and/or frequency based on the cooking time, power, and/or recipe selected. Alternatively, the control electronics 220 may be enabled to make adjustments to cooking time based on the adjustment of either or both of the temperature/air speed and energy level/frequency/phase. In some cases, a separate instance of a processor (or processors) and memory may be associated with energy application (perhaps even distinctly separate between the first and second energy sources 200 and 210), and user interface.

In an example embodiment, the control electronics 220 may access instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process.

Accordingly, for example, the control electronics 220 may be configured to extrapolate, calculate or otherwise determine the amount of energy to be directed into food product so that accurate cooking effects may be anticipated to maximize the quality of cooking, and eventually the final results of the total cooking process. The control electronics 220 may then control operation of the RF generator 204 and/or the antenna assembly 130 based on the static and dynamic inputs provided. Thus, if different food items are located in the cooking chamber 102, the control electronics 220 may direct a desired amount of RF energy to the appropriate respective different food items to achieve the desired cooking results. In other words, the energy application could be provided in a manner that is at least somewhat specific to the food being cooked. Unlike a conventional microwave or combination oven, in which the user essentially selects a power level and time for application of RF energy and the RF energy is thereafter applied indiscriminately for the selected time at the corresponding power level regardless of the food product being cooked, example embodiments employ control over the specific frequencies and phases applied for the user selected power and time requirements based on the food product (or at least the recipe that corresponds to the food product) in the cooking chamber 102. Moreover, example embodiments employ a learning process to determine specific power, time, frequency and/or phase information to employ during the cooking process. The learning process may be executed either at the beginning of the RF application stage during a cooking process and selectively or repeatedly during the application of RF energy at various times or intervals during the cooking process (continuous learning as referred to earlier). As such, for example, the user may select a recipe for a given food product, and a corresponding initial algorithm may be selected to start the cooking process using a selected power level, frequency and phase combination to be used for the cooking process. Thereafter, the learning process may be executed periodically, and if a trigger event is detected, a new algorithm may be selected automatically based on the employment of new power, selected frequency and/or phase combinations that are determined by the learning process employed to receive feedback regarding how the specific food product placed in the cooking chamber 102 reacts with or to the RF energy being applied therein.

Furthermore, in some example embodiments, the control electronics 220 may be configured to determine a cooking impact that heat addition associated with convective heating may provide to an already calculated cook time associated with another energy source (e.g., the first energy source 200). Thus, for example, if a cook time is determined for cooking relative to heating applied by the first energy source 200, and adjustments or inputs are made to direct usage of the second energy source 210, the control electronics 220 may be configured to calculate adjustments (and apply such adjustments) to the application of the first energy source 200 in order to ensure that the cooking operation does not overcook or overheat the food product.

As discussed above, in some embodiments, the control electronics 220 may be configured to perform a learning step or process to enable information to be learned about the location and/or absorption characteristics of the food product within the cooking chamber 102. The power, phase and/or frequency may then be selected and/or controlled to provide different amounts, frequencies, phases, etc., of RF energy to be directed to different portions of the cooking chamber 102 to correspond to the foods located in the cooking chamber 102. In some embodiments, the control electronics 220 may be configured to adjust calculations regarding the times and/or amounts of RF energy to be applied to achieve a certain level of doneness (e.g., associated with a corresponding amount of energy absorption) based on oven 100 configuration as indicated by the learning process. However, typically, the user will select the time and perhaps also the amount of energy either directly (e.g., by manually entering such parameters) or indirectly (e.g., by selecting a recipe or cooking program that prescribes the time and power level or amount of RF).

In some cases, the processing circuitry 300 may convert user input provided via the user interface 340 into instructions for control of the first and second energy sources 200 and 210 based on stored algorithms or other programs, as described herein. In this regard, for example, the user interface 340 may provide one or more screens or interface consoles that enable inputs to be provided and thereafter processed in corresponding ways that enable the control capabilities of the oven 100 to be optimally employed. These screens or interface consoles may therefore define a workflow that enables unique capabilities for the operation of the oven 100 and user experience in interacting with the oven 100.

The processing circuitry 300 may (e.g., via the memory 320) store a plurality of algorithms. As mentioned above, each of the algorithms may define at least frequency and phase combinations for application of EM energy into the cooking chamber 102. In some cases, the algorithms may also define a power level and/or time for application. The algorithms may be stored in any suitable organizational structure. However, in one example embodiment, each algorithm may be classified or organized so that algorithms of different types can be identified for selection by the processing circuitry 300 for employment under specific conditions.

In some example embodiments, algorithm types may be classified according to the stage of execution of a cooking program (e.g., start, middle and finishing algorithms) or by any other temporal association relative to the time of execution of the cooking program (e.g., first 20%, middle 30%, last 10%, etc.). In such an example, a list of algorithms may be stored in association with each respective stage of execution and/or temporal association. In some cases, the algorithm types may be classified based on performance aspects. For example, performance aspects may include ratings or classifications based on efficiency of absorption or uniformity of EM energy application in the cooking chamber 102. In this regard, a "hard" algorithm may be an algorithm with rigorous requirements relative to delivery of high efficiency for heat absorption (e.g., without regard to uniformity). Meanwhile, a "soft" algorithm may be an algorithm with weaker requirements for efficiency, but higher expectations for uniformity within the cooking chamber 102. In an example embodiment, algorithm types may be also or alternatively be distinguished from each other based on the specific parameters they employ. For example, type differentiation may be made based on cooking power, frequency parameters or phase parameters for application of the EM energy. Type distinctions may also be made relative to the food product itself (e.g., proteins, baked goods, liquids, etc.) or the cooking activity (e.g., cooking, thawing, reheating, etc.).

Figure 4:
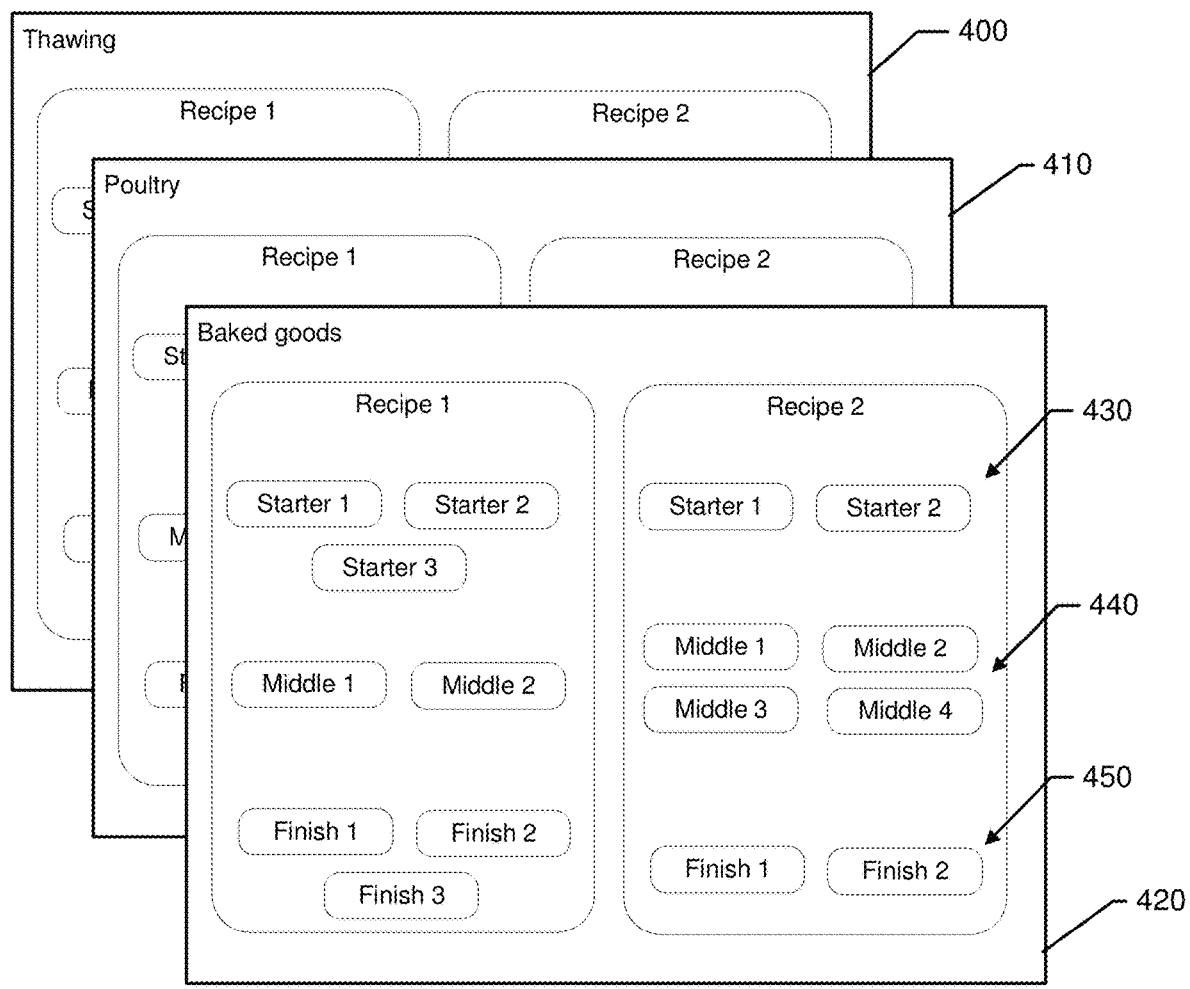
FIG. 4 illustrates a structure for storage and organization of algorithms according to an example embodiment.

FIG. 4 illustrates a conceptual diagram of one potential type differentiation structure for storage of algorithms in memory 320. As shown in FIG. 4, algorithms may be stored in association with various recipes that may further be organized or associated with different food products or cooking operations. Thus, for example, a plurality of recipes for a thawing operations recipe list 400 may include corresponding available algorithms (e.g., different types) that are useable for thawing of specific foods (e.g., each food corresponding to a thawing recipe). Meanwhile, a plurality of recipes for cooking a protein (e.g., poultry) may be stored as poultry cooking recipe list 410. Each recipe for cooking poultry may include respective different types of corresponding available algorithms that are useable for the specific recipe in question. Finally, a baked goods recipe list 420 may be provided. The baked goods recipe list 420 may include a plurality of recipes (e.g., recipe 1, recipe 2, . . . , recipe n) that may each include a corresponding plurality of available (i.e., selectable) algorithms to direct application of EM energy into the food product during execution of the corresponding recipe (i.e., cooking program). The algorithms may be differentiated by algorithm type including a first algorithm type 430 (e.g., starter algorithms for use early on in the cooking process), a second algorithm type 440 (e.g., algorithms used in the relative middle of a cooking process), and a third algorithm type 450 (e.g., finishing algorithms used to finish a cooking process).

Each recipe may include unique algorithms, or some of the algorithms may be useful in multiple different recipes. Each algorithm may define at least a frequency and phase combination to be applied during the execution of the corresponding algorithm. In some cases, algorithms of a specific type may only be eligible for selection at predetermined time periods or in response to predetermined criteria or stimuli. For example, starter algorithms may only be selectable within the first 20% of the run time of a cooking program. However, in other cases, a selected algorithm may be eligible for continued use throughout an entire cooking process, and there may not be restrictions on when any particular algorithm is selectable.

The control electronics 220 may be configured to select an initial algorithm to employ based on a primary algorithm that is predefined for each recipe, based on manual user selection, or based on past learning for a given recipe. After the initial algorithm is selected, the control electronics 220 may initiate or at least receive information associated with the execution of the learning process. The learning process, when executed, may provide feedback to the control electronics 220 on the efficacy or other parameters associated with absorption of the EM energy into the food product. Thus, for example, the feedback may include a value indicative of absorption of the EM energy into the food product. As a result of the feedback, the control electronics 220 may be configured to determine whether any trigger event has occurred. Responsive to detection of a trigger event, the control electronics 220 may initiate selection of a new algorithm to direct application of the EM energy to the food product during the continued execution of the cooking program.

In an example embodiment, the trigger event may be indicative of a change in property of the food product. For example, the change in property may be a change in composition, change in geometry, change in orientation, or change in internal or external temperature of the food product as indicated by a corresponding change in the absorptivity of the food product. Thus, the incident power applied to the food product may be compared to the reflected power from the cavity received by the solid state electronic RF/MW system and/or power amplifiers to determine the efficiency. Based on the efficiency measured, a determination may be made as to whether to change algorithms. Alternatively or additionally, the trigger event may be temporally based. For example, time intervals may be defined relative to the execution of a cooking program to determine when certain amounts of time have elapsed. When each period of time (e.g., predetermined constant or different values of time) elapses, a learning process may be initiated. Thus, the trigger event (or at least determinations to detect such events) may be cyclically recurring. Decision trees may be provided to guide decisions on what algorithms to choose next in various situations or scenarios.

Figure 5:
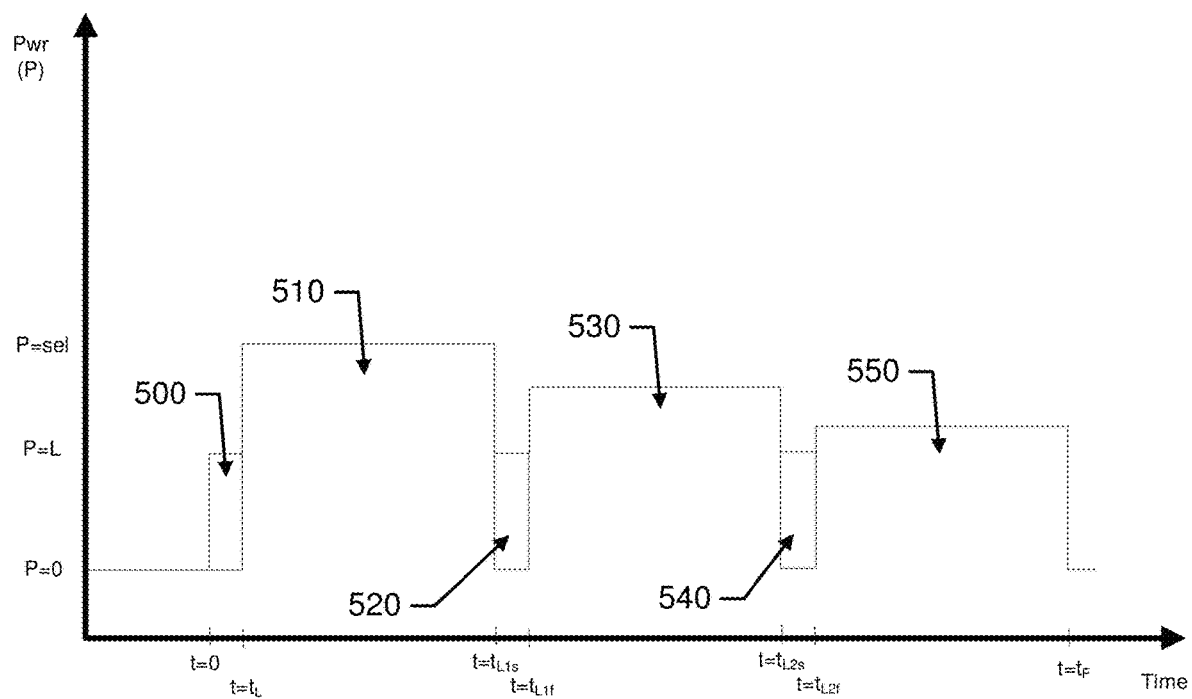
FIG. 5 illustrates a plot of power versus time to show learning processes and cooking processes for various selected algorithms in accordance with an example embodiment.

As discussed above, a learning process may initially be employed to automatically select an algorithm to be employed at the selected power level during the time defined for cooking. FIG. 5 illustrates a plot showing the application of EM energy during the cooking time ($t_F$). In this regard, the power level of the RF energy is initially zero. Then, at time t=0 the learning process 500 begins. During the learning process 500, a plurality of frequencies, within a frequency band, are generated for provision into the cooking chamber 102. For example, if the frequencies are ISM band frequencies around 2.41 to 2.49 GHz, the control electronics 220 may generate eleven different frequencies (e.g., 2.41, 2.42, . . . , 2.49 GHz) for provision into the cooking chamber 102 and efficiency measurements may be made at each frequency and phase combination at each of four ports associated with four power amplifiers, holding one power amplifier as a reference, to determine which frequencies have the highest efficiency as indicated by having a low reflected power and maximum power delivery to the food item (e.g., absorption). The learning process 500 continues until the end of the learning at time $t_L$. However, other strategies may also be employed in alternative embodiments.

After the learning process 500 is complete. A first algorithm is selected and a corresponding first cooking process 510 is initiated based on the first algorithm. In some cases, the first algorithm 510 may be a selected starter algorithm. The first algorithm may instruct that EM energy be applied with the frequency and/or phase that correspond to the first algorithm. The first cooking process 510 occurs at the frequency or frequencies and phase or phases selected from the learning process 500 until a second learning process 520 is performed.

The second learning process 520 may be performed based on temporal criteria or other event based criteria associated with the recipe. Feedback may be received during the second learning process 520 and the control electronics 220 may compare the feedback data to various thresholds or other selection criteria. If the selection criteria are met, a second algorithm may be selected and a corresponding second cooking process 530 may be initiated based on the second algorithm. In some cases, the second algorithm may be a selected middle algorithm. The second algorithm may instruct that EM energy be applied with the frequency and/or phase that correspond to the second algorithm. The second cooking process 530 occurs at the frequency or frequencies and phase or phases selected from the second learning process 520 until a third learning process 540 is performed.

Similar to the description above, the third learning process 540 may be performed based on temporal criteria or other event based criteria associated with the recipe. Feedback may be received during the third learning process 540 and the control electronics 220 may compare the feedback data to various thresholds or other selection criteria. If the selection criteria are met, a third algorithm may be selected and a corresponding third cooking process 550 may be initiated based on the third algorithm. In some cases, the third algorithm may be a selected finishing algorithm. The third algorithm may instruct that EM energy be applied with the frequency and/or phase that correspond to the third algorithm. The third cooking process 550 occurs at the frequency or frequencies and phase or phases selected from the third learning process 540 until completion of the recipe at $t_F$.

In an example embodiment, the learning process is executed each time a cooking program is executed, or each time a particular cooking operation is executed. Moreover, in some cases, each of the instances in which the learning process is run is completely independent of any prior learning processes. Thus, the learning performed for one execution of a recipe does not necessarily mean that identical (or even similar) results will be achieved the next time the same recipe is executed. As such, even for repeatable cooking processes or programs, the frequency and the phase parameters determined responsive to learning may be automatically selected separately each time the cooking processes or programs are repeated such that a set of first selected frequency and phase parameters for a first instance of the learning process may be different than a set of second selected frequency and phase parameters associated with a second instance of the learning process for execution within a single cooking program or a subsequent instance of execution of the cooking program.

In some cases, the learning process may be initiated at predefined intervals (e.g., every 5 seconds), or when shifting between cooking stages (e.g., start, middle, and finish). Changes in food properties may be detected during the learning process based on changes in efficiency either generally, or for a specific combination of frequency and phase. In other words, some changes in phase and frequency combination may cause corresponding changes in absorption, so changes in absorption may only be triggering events when the changes are detected for a specific combination of frequency and phase.

In an example embodiment, an oven may be provided. The oven may include a cooking chamber configured to receive a food product, an EM heating system configured to provide EM energy into the cooking chamber using solid state electronic components, and control electronics configured to control the EM heating system. The control electronics may be configured to enable user selection of a cooking program associated with cooking the food product. The control electronics may be configured to select a first algorithm to direct application of the EM energy to the food product. The control electronics may be configured to perform a learning process to receive feedback on execution of the cooking program during execution of the cooking program according to the first algorithm. Responsive to detecting a trigger event during the learning process, the control electronics are configured to select a second algorithm that is different from the first algorithm to direct application of the EM energy to the food product during execution of the cooking program.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the learning process may include detecting an efficiency measure relative to absorption of the EM energy into the food product, and the feedback may include a value indicative of absorption of the EM energy into the food product. In some cases, the learning process may be repeated multiple times during the cooking program. In an example embodiment, the first algorithm and the second algorithm may each be selected from among different algorithm types. In some examples, the algorithm types may be classified by a temporal association with a stage of execution of the cooking program. Alternatively or additionally, the algorithm types may be classified based on efficiency of absorption or based on uniformity of EM energy application in the cooking chamber. Alternatively or additionally, the algorithm types may be differentiated based on one or more of cooking power, frequency parameters and phase parameters for application of the EM energy. In an example embodiment, the trigger event may be indicative of a change in property of the food product. In such an example, the change in property may include a change in composition, change in geometry, change in orientation, or change in internal or external temperature of the food product. In an example embodiment, the trigger event may be defined by elapsing of a predetermined period of time. In this regard, for example, in some cases the trigger event may be cyclically recurring. In some embodiments, the oven may further include a convective heating system configured to provide heated air into the cooking chamber. In such an example, the control electronics may be configured to control the convective heating system and the EM heating system. The cooking program may include multiple stages with different cooking objectives in at least two stages, and the cooking program may define different algorithms and different controls for the convective heating system for the at least two stages.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product;
an electromagnetic (EM) heating system configured to provide EM energy into the cooking chamber using solid state electronic components; and
control electronics configured to control the EM heating system,
wherein the control electronics are configured to enable user selection of a cooking program associated with cooking the food product,
wherein the control electronics are configured to select a first algorithm to direct application of the EM energy to the food product,
wherein the control electronics are configured to interrupt the first algorithm to perform a learning process interrupting the cooking process and to receive feedback on execution of the learning process during execution of the cooking program according to the first algorithm,
wherein, responsive to detecting a trigger event during the learning process, the control electronics are configured to select a second algorithm that is different from the first algorithm to direct application of the EM energy to the food product during execution of the cooking program,
wherein the first algorithm defines a first power level and a first combination of frequency and phase for application of the EM energy into the cooking chamber, and the second algorithm defines a second power level and a second combination of frequency and phase for application of the EM energy into the cooking chamber, and
wherein the learning process comprises applying, during a period of the interrupting of the cooking process, a plurality of frequencies and detecting an efficiency measure relative to absorption of the frequencies into the food product, and the feedback comprises a value indicative of absorption of the frequencies associated with the learning process into the food product.

2. The oven of claim 1, wherein the learning process is repeated multiple times during the cooking program.

3. An oven comprising:
a cooking chamber configured to receive a food product;
an electromagnetic (EM) heating system configured to provide EM energy into the cooking chamber using solid state electronic components; and
control electronics configured to control the EM heating system,
wherein the control electronics are configured to enable user selection of a cooking program associated with cooking the food product,
wherein the control electronics are configured to select a first selected algorithm to direct application of the EM energy to the food product,
wherein the control electronics are configured to interrupt the first algorithm to perform a learning process interrupting the cooking process and to receive feedback on execution of the learning process during execution of the cooking program according to the first selected algorithm,
wherein, responsive to detecting a trigger event during the learning process, the control electronics are configured to select a second selected algorithm to direct application of the EM energy to the food product during execution of the cooking program,
wherein the first selected algorithm and the second selected algorithm are different algorithm types, the first selected algorithm being selected from among a plurality of candidate algorithms of a first type, and the second selected algorithm being selected from among a plurality of candidate algorithms of a second type, and
wherein the learning process comprises applying, during a period of the interrupting of the cooking process, a plurality of frequencies and detecting an efficiency measure relative to absorption of the frequencies into the food product, and the feedback comprises a value indicative of absorption of the frequencies associated with the learning process into the food product.

4. The oven of claim 3, wherein the algorithm types are classified by a temporal association with a stage of execution of the cooking program such that the first selected algorithm is associated with a first stage of cooking the food product and the second selected algorithm is associated with a second stage of cooking the food product, and the trigger event comprises detecting a transition from the first stage to the second stage.

5. The oven of claim 3, wherein the algorithm types are classified based on efficiency of absorption or based on uniformity of EM energy application in the cooking chamber.

6. The oven of claim 3, wherein the algorithm types are differentiated based on one or more of cooking power, frequency parameters and phase parameters for application of the EM energy.

7. The oven of claim 1, wherein the trigger event is indicative of a change in property of the food product, wherein the change in property includes a change in composition, change in geometry, change in orientation, or change in internal or external temperature of the food product.

8. The oven of claim 1, wherein the trigger event comprises elapsing of a predetermined period of time.

9. The oven of claim 8, wherein the trigger event is cyclic.

10. The oven of claim 1, further comprising a convective heating system configured to provide heated air into the cooking chamber,
wherein the control electronics are configured to control the convective heating system and the EM heating system,
wherein the cooking program includes multiple stages with different cooking objectives in at least two stages, and
wherein the cooking program defines different algorithms and different controls for the convective heating system for the at least two stages.

11. Control electronics configured to control an electromagnetic (EM) heating system configured to provide EM energy into a cooking chamber of an oven using solid state electronic components, the control electronics comprising a memory and processor, the memory storing a plurality of cooking programs for execution by the processor,
wherein the control electronics are configured to enable user selection of a cooking program associated with cooking a food product in the cooking chamber,
wherein the control electronics are configured to select a first algorithm to direct application of the EM energy to the food product,
wherein the control electronics are configured to interrupt the first algorithm to perform a learning process interrupting the cooking process and to receive feedback on execution of the learning process during execution of the cooking program according to the first algorithm,
wherein, responsive to detecting a trigger event during the learning process, the control electronics are configured to select a second algorithm that is different from the first algorithm to direct application of the EM energy to the food product during execution of the cooking program,
wherein the first algorithm defines a first power level and a first combination of frequency and phase for application of the EM energy into the cooking chamber, and the second algorithm defines a second power level and a second combination of frequency and phase for application of the EM energy into the cooking chamber, and
wherein the learning process comprises applying, during a period of the interrupting of the cooking process, a plurality of frequencies and detecting an efficiency measure relative to absorption of the frequencies into the food product, and the feedback comprises a value indicative of absorption of the frequencies associated with the learning process into the food product.

12. The control electronics of claim 11, wherein the learning process is repeated multiple times during the cooking program.

13. The control electronics of claim 11, wherein the first algorithm and the second algorithm are different algorithm types.

14. The control electronics of claim 13, wherein the algorithm types are classified by a temporal association with a stage of execution of the cooking program.

15. The control electronics of claim 13, wherein the algorithm types are classified based on efficiency of absorption or based on uniformity of EM energy application in the cooking chamber.

16. The control electronics of claim 13, wherein the algorithm types are differentiated based on one or more of cooking power, frequency parameters and phase parameters for application of the EM energy.

17. The control electronics of claim 11, wherein the trigger event is indicative of a change in property of the food product, wherein the change in property includes a change in composition, change in geometry, change in orientation, or change in internal or external temperature of the food product.

18. The control electronics of claim 11, wherein the trigger event comprises elapsing of a predetermined period of time, and wherein the trigger event is cyclic.

* * * * *